E. QUINN.

Steam Gage.

No. 2,516. Reissued March 19, 1867.

Witnesses
John D Blair
D C Bamwell

Inventor
Emmitt Quinn

N. PETERS, Photo-Lithographer, Washington, D. C.

United States Patent Office.

EMMETT QUINN, OF WASHINGTON, DISTRICT OF COLUMBIA.

*Letters Patent No.* 53,183, *dated March* 13, 1866; *reissue No.* 2,516, *dated March* 19, 1867.

IMPROVEMENT IN STEAM GAUGES.

The Schedule referred to in these Letters Patent and making part of the same.

TO ALL WHOM IT MAY CONCERN:

Be it known that I, EMMETT QUINN, of Washington, District of Columbia, have invented a new and improved Steam Gauge; and I do hereby declare the following to be a full and exact description of the same, reference being had to the accompanying drawings, and to the letters of reference marked thereon.

This invention relates to that class of steam gauges known as the compound siphon gauge, in which two fluids of different specific gravity are used to indicate the pressure of steam in the boiler, and consists in the construction of the couplings between each upright tube, whereby the fluids can be conveniently introduced and secured therein, a proper proportion of each remaining in each column or tube, and prevented from mingling with others, and thus destroying the efficacy of the gauge, and without which it could not be transported with safety. Also in the arrangement of the tubes, so that the final or index tube shall always be the centre one in the face of the gauge, and all in a compact body, so as to be easily fitted into a neat and convenient case, and suitable for transportation.

To enable others skilled in the art to make and use my invention, I will proceed to describe its construction and operation.

Figure 1:
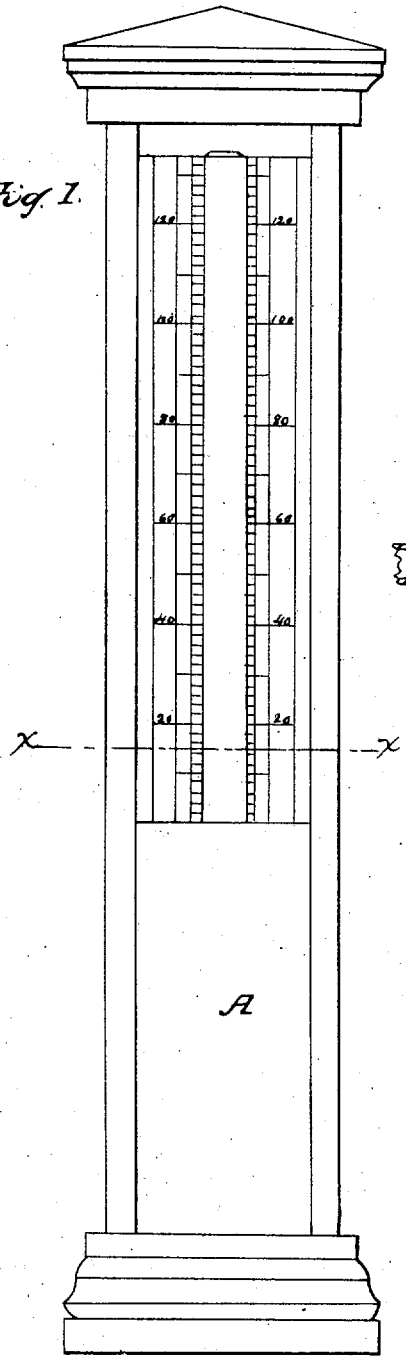

Figure 1 is a front elevation of the gauge.

Figure 2:
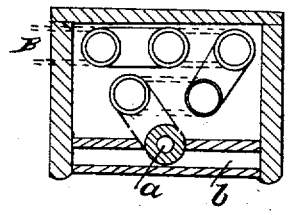
Figure 3:
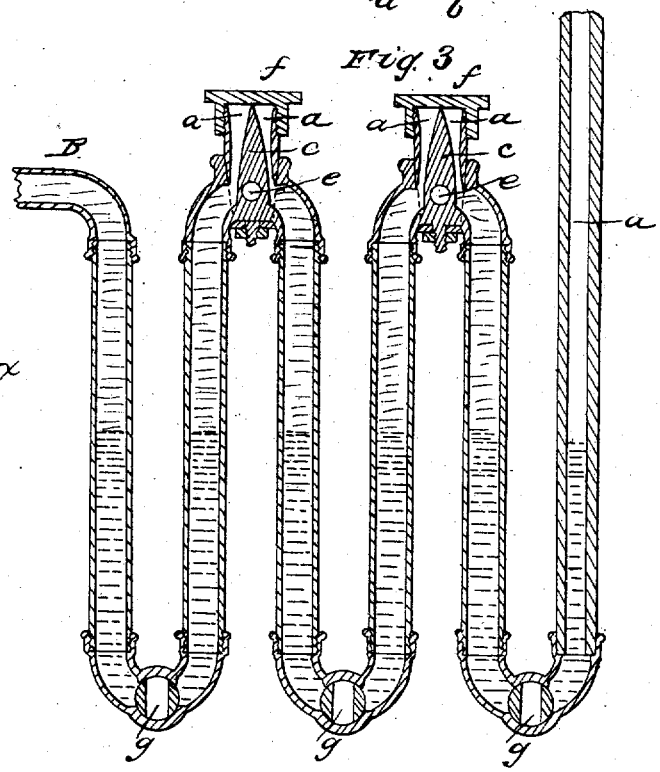

Figure 2 is a transverse section, as indicated by red line *x x;* the couplings or bends of the tubes at bottom shown by shading in full lines; the top ones, and the connection with the steam pipe B by dotted lines Figure 3 is a vertical section of the tubes, each being in the same vertical plane, instead of being arranged as in fig. 2, for the purpose of more clearly illustrating the relative position in the tubes of the two fluids, and the means of introducing them, and of separating that in each tube from the others, which is essential to their safe transportation.

A, fig. 1, is the front of the case of the gauge; *a a a*, figs. 1, 2, and 3, the last or index tube, of glass, which may be longer, and the calibre or bore somewhat less than the other tubes, to show a longer range of movement of the mercury than in the other tubes. The index scales or registers, fig. 1, are protected by a plate of glass, *b*, fig. 2. In each top coupling, fig. 3, is a stop-cock, the key *c* of which, besides the ordinary port or way *e*, is supplied with two induction ports *d d*, running from the top and opening into the interior of the coupling on each side of the port *e*, and communicating with the tubes, each on its respective sides, but prevented from communicating with each other by the cap *p*, secured on top of the key. The bottom couplings are each furnished with an ordinary stop-cock, *g*. When the gauge is secured to its place ready for operation, the keys of all the cocks are turned one-fourth round from the position shown, which restores communication between the tubes, but severs it between them and the ports *d d*. It is evident that this gauge can be applied to all kinds of boilers or cylinders where it is desirable to ascertain the amount of pressure, as in hydraulic presses, blowing-engines for furnaces, &c.

Having thus described my invention, what I claim as new, and desire to secure by Letters Patent, is—

1. The construction of a compound siphon steam gauge, so that the movements of the fluids in each tube are therein confined, and prevented from entering and mingling with those in the others during transportation, substantially as herein set forth.

2. The combination, with the gauge, of an index tube of a less calibre than the other tubes in said gauge, substantially as herein described.

EMMETT QUINN.

Witnesses:

EDM. F. BROWN,

J. B. PHILLIPS.